May 20, 1941.                 C. E. COCHRAN                 2,242,454
           AXLE AND WHEEL MOUNTING FOR INDUSTRIAL TRUCKS
                Filed Dec. 16, 1938           3 Sheets-Sheet 1
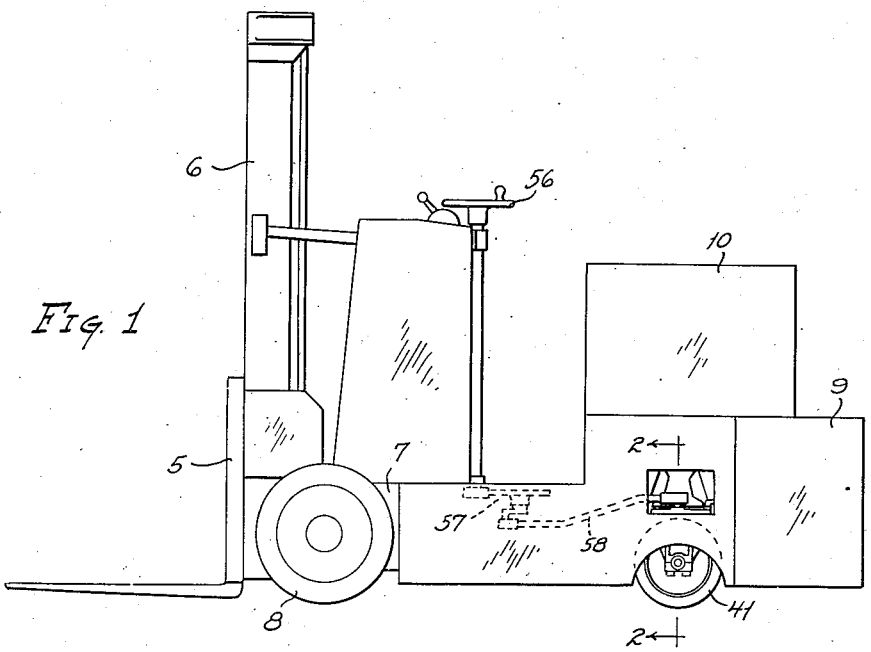
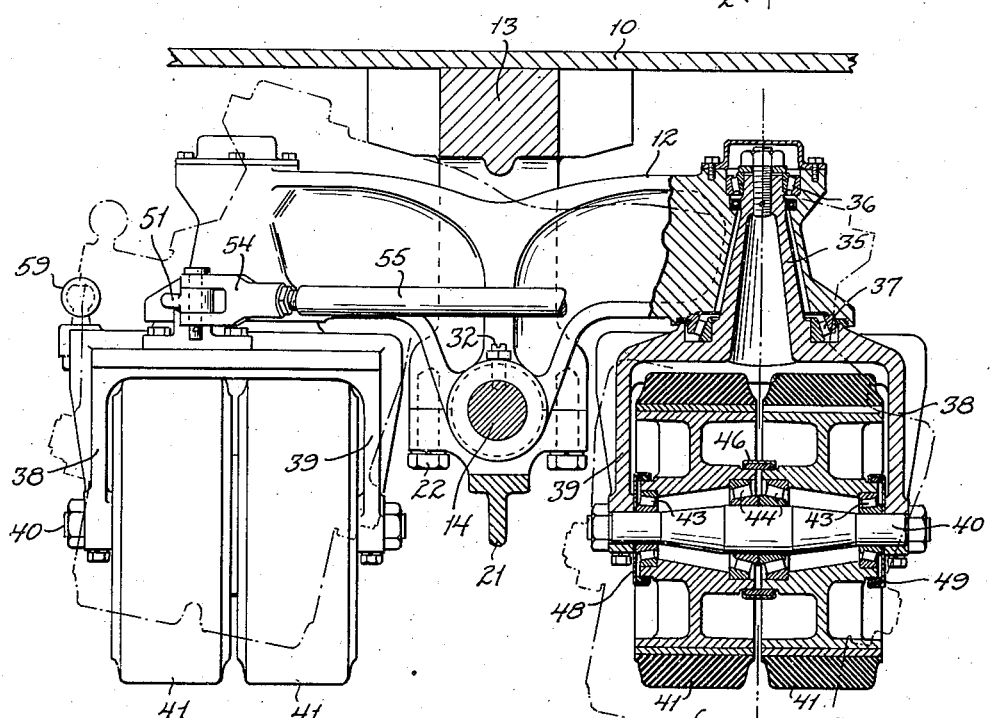
INVENTOR.
CLYDE E. COCHRAN
BY Bates, Goldrick, & Teare
ATTORNEYS May 20, 1941.      C. E. COCHRAN      2,242,454
AXLE AND WHEEL MOUNTING FOR INDUSTRIAL TRUCKS
Filed Dec. 16, 1938      3 Sheets-Sheet 3

INVENTOR.
BY CLYDE E. COCHRAN
Bates, Golrick, & Teare
ATTORNEYS

Patented May 20, 1941

2,242,454

UNITED STATES PATENT OFFICE 2,242,454

AXLE AND WHEEL MOUNTING FOR INDUSTRIAL TRUCKS

Clyde E. Cochran, Cleveland, Ohio, assignor to The Elwell-Parker Electric Company, Cleveland, Ohio, a corporation of Ohio Application December 16, 1938, Serial No. 246,139

13 Claims. (Cl. 280—95)

This invention is directed to improvements in industrial trucks, and more particularly to axle and wheel mounting structures therefor.

One of the usual requirements of an industrial truck construction is that the chassis of the truck structure be constructed to be disposed as low as possible, thus bringing about the necessity of using wheels of comparatively small diameter. The wheels are equipped with solid rubber tires and it is not infrequent that it becomes necessary to resort to the use of multiple tire arrangements, whereby the load-carrying and lifting capacity of the truck can be increased. It is necessary, in such arrangements, that the wheel mountings or the rim and tire mountings be relatively turnable, and an example of the latter construction is disclosed in the Buckwalter Patent, No. 1,072,818, issued September 9th, 1913.

When such a wheel mounting is used, however, the tires are subjected to considerable wear when the truck is making a sharp turn, due to the fact that the tires have a tendency to slide or skid in a direction tangentially to the curvature of the turn, thus causing an abrasive action upon the tires. Also, the steering difficulties were increased when multiple tires were used.

One of the objects of the present invention, therefore, is the provision of a multiple wheel mounting for an industrial truck, which will eliminate all tendency of the tires to slide or skid when the truck is being maneuvered through sharp turns.

A further object of the present invention is the provision of an axle and wheel mounting construction, which will function to distribute the truck load uniformly to the tires.

A still further object of the present invention is the provision of an axle and dual-wheel mounting construction, which will permit pairs of wheels to follow irregularities in pavements, whereby no particular tire of the pairs of wheels will become unduly loaded.

Other objects of my invention will become apparent from the following description relating to the accompanying drawings, showing a preferred form thereof. The essential characteristics are summarized in the claims.

Figure 3:
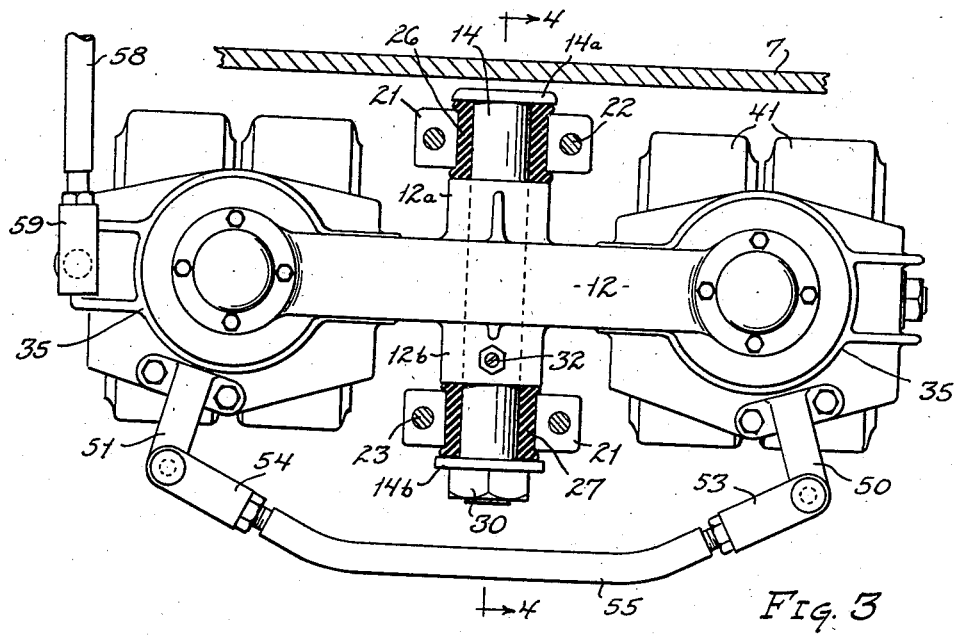
Figure 4:
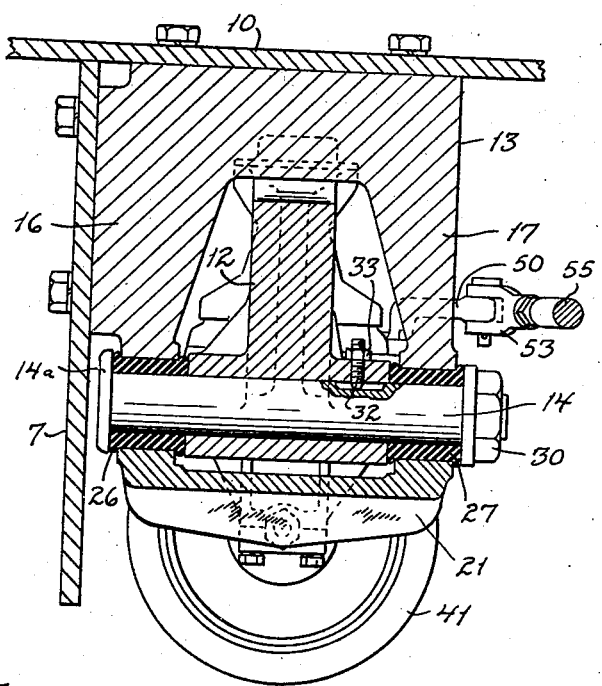
Figure 5:
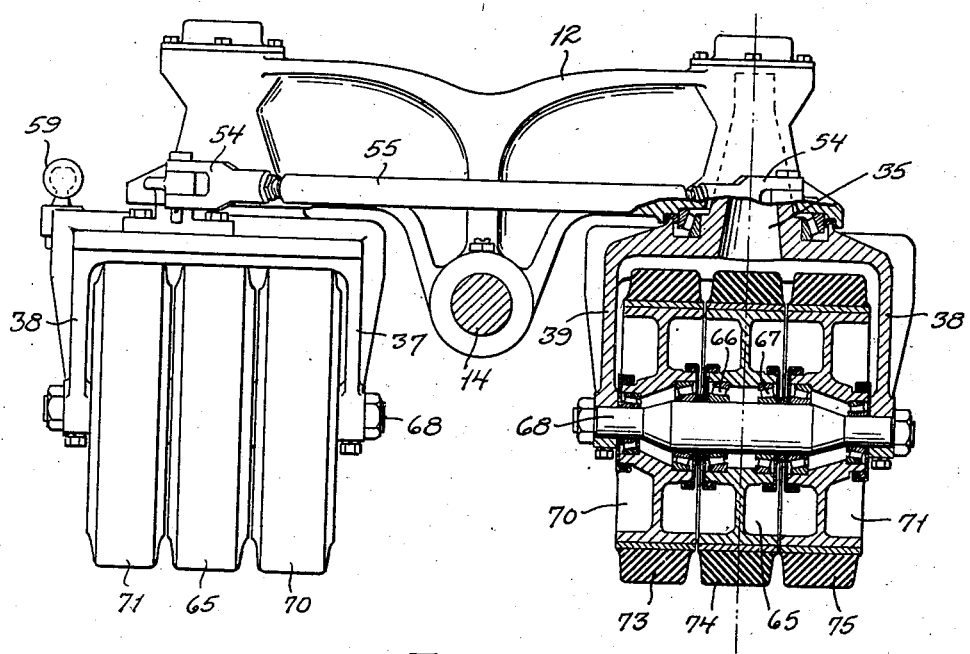
Figure 6:
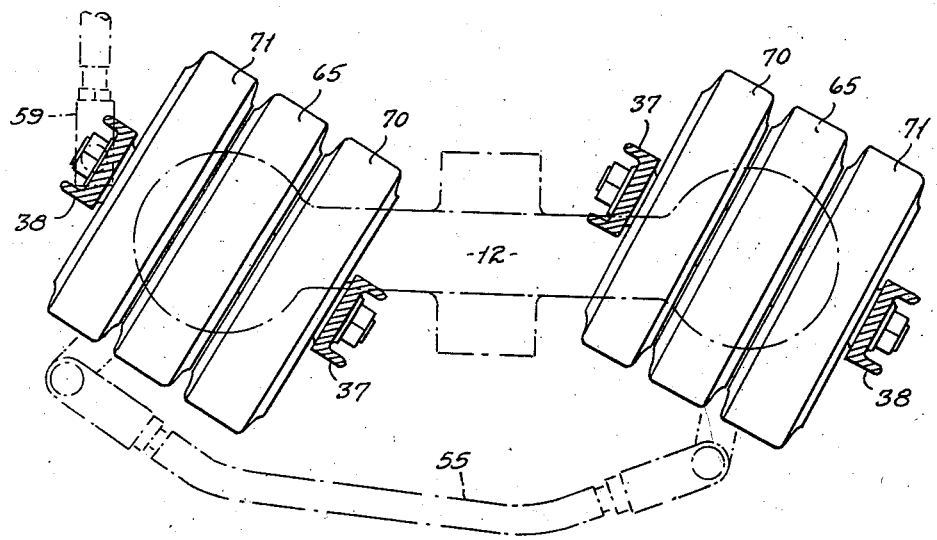

In the drawings, Fig. 1 is a side elevational view of an industrial truck of the tier-lift type, embodying my invention; Fig. 2 is an enlarged cross-sectional view, taken through the wheel mountings and axle structure of the truck substantially along the line 2—2 of Fig. 1; Fig. 3 is a plan view of the axle and wheel mounting structure, shown partly in cross-section, and Fig. 4 is a fragmentary, cross-sectional view taken through the axle and chassis connection of the truck, substantially along the line 4—4 of Fig. 3; Figs. 5 and 6 show a modification.

Referring to Fig. 1 of the drawings, the truck is illustrated as comprising an upright mechanism 6 mounted on one end of the truck frame 7, adjacent a pair of forward non-dirigible wheels 8. The upright 6 comprises a slide for a load-engaging carriage 5, the opposite end of the truck being provided with a counter-weight 9, and a source of power within the housing 10, usually comprises a storage battery for powering a motor. Immediately beneath the housing 10 is an axle member 12, which is connected to a chassis member 13 by a longitudinally extending pin 14. The chassis member 13, Fig. 4, is shaped to extend over the top of the axle member 12 and has two depending legs 16 and 17, which extend downwardly to afford a connection for the pivot pin 14.

In the particular axle-chassis connecting mechanism shown, the depending parts 16 and 17 of the chassis member 13 have the lower faces thereof properly shaped to be connected to a cap member 21, by pairs of bolts 22 and 23, and interposed between the pin 14 and the chassis member are resilient sleeves 26 and 27, which are maintained in a compressed condition so that any relative rocking movement which takes place between the axle 12 and the pin 14 creates a torsional stress in the resilient sleeves 26 and 27. The compressed condition of the resilient sleeves 26 and 27 is brought about as follows:

When the axle is being attached to the chassis member 13, the pin 14 has the sleeve 26 slipped thereon to abut the pin head 14a. The pin is then passed through a longitudinally extending bore formed in the axle to extend through the axle bosses 12a and 12b (see Fig. 3). The resilient sleeve 27 is then slipped onto the pin and the axle is then brought into engagement with the depending portions 16 and 17 of the chassis member 13, whereupon the clamping cap 21 is secured in position by cap bolts 22 and 23. A washer member 14b is then placed upon the pin 14 to abut the end of the resilient sleeve 27 and a nut 30 is then brought into engagement with the threaded end of the pin to cause the sleeve members 26 and 27 to be compressed, as indicated in Fig. 3. To prevent any relative turning movement between the pin 14 and the axle 12, I provide a set screw 32 and a lock nut 33 therefor, the inner end of the set screw 32 engaging in a suitable slot formed in the pin member 14.

Mounted adjacent the outer ends of the axle member 12 are spindle members 35, which are disposed to turn about vertical axes, the axle end being suitably shaped to receive upper and lower spindle-bearing mechanisms 36 and 37, respectively, and protect the same from foreign matter.

The spindle members 35, as shown in Fig. 2, have the lower part thereof yoke-shaped to provide outer and inner side arms 38 and 39, which support the ends of wheel spindles 40. Mounted upon the wheel spindles 40 is a dual-wheel arrangement or a pair of wheels 41, each of which is provided with bearing mountings 43 and 44, whereby each wheel 41 is rotatable relative to the other wheel, and the construction of the spindle mechanism 35 and depending arms 38 and 39 is such that the wheel 41 is equi-distantly spaced relative to the vertical axis of the spindle member 35. To prevent the ingress of dirt to the bearing members 44 I provide a metallic annular shield 46, which may be interiorly faced with felt, to engage annular finished surfaces formed on the hubs of the wheel members 41. Metallic sealing discs 48 and 49 may likewise be fitted to the outer ends of the hub of the wheel members 41.

To steer the pairs of wheels 41 I provide arms 50 and 51. which may be exteriorly attached to the spindle members 35 (see Fig. 3), and which are pivotally connected to yoke members 53 and 54, the latter being adjustably connected to a tie rod 55. The remainder of the steering mechanism, conventionally shown in Fig. 1, comprises a steering wheel 56 connected to a suitable linkage mechanism indicated at 57, including a longitudinally extending steering link 58. The steering link 58 is connected to one of the spindle members 35, as indicated at 59, in Fig. 3.

The modified form of the wheel mounting shown in Figs. 5 and 6 illustrates the adaptability of the invention to the positioning of more than one pair of wheels on a single caster mounting, all of the parts of the axle and steering construction being the same, as hereinbefore described. As shown in cross-section in Fig. 5, a center wheel 65 is mounted upon bearing mechanisms 66 and 67, which are supported by the non-rotatable wheel spindles 68. On each side of the central wheels 65 are wheels 70 and 71, likewise mounted on bearing mechanisms supported by the wheel spindle 68. With this arrangement a still greater load-supporting area is provided by tire members 73, 74 and 75, respectively mounted upon the wheel members 65, 70 and 71, while the advantages of steering and sharper turning radii are not lost.

The foregoing described axle and wheel mounting has been found to be highly satisfactory, particularly when the loads on the truck are relatively heavy on the counterweighted end of the truck, and it has been found that difficulties heretofore encountered in the steering of dual-wheeled arrangements have been overcome. Likewise, by having the turning axis of the dual-wheel mountings bisect the dual-wheel assembly, the wheels can be turned to angles of almost ninety degrees in either direction, and with ease, even though the truck is not in motion. In addition to the fact that difficulty in steering the truck has been overcome, it has been found that such a mounting materially prolongs the life of the tires. Furthermore, the construction is such that all operating parts can be provided with precision bearings which can be completely housed and readily protected from dirt and grit.

I claim:

1. In an industrial truck, the combination of a truck chassis, a rockable axle, a pin means pivotally connecting the axle to the chassis whereby the axle may rock about a longitudinally extending axis relative to the truck frame, torsion means associated with the pivotal means tending to maintain the axle stable relative to the chassis, dirigible spindle members mounted adjacent each end of the axle, a pair of wheels connected to each spindle member with the axes of the spindle members disposed centrally of said pairs of wheels and steering mechanism connecting the spindle members, whereby said pairs of wheels may be steered in unison about said vertical axes.

2. In an industrial truck, the combination of a truck chassis, a rockable axle, torsion means pivotally connecting the axle to the chassis whereby the axle may rock upon a longitudinally extending axis relative to the truck frame, and be maintained normally level by said torsion means, dirigible spindle members mounted in hollow formations adjacent the ends of the axle, a pair of independently rotatable wheels connected to each spindle member with the axes of each spindle member disposed centrally of a pair of wheels and steering mechanism connecting the spindle members, whereby said pairs of wheels may be steered in unison about said vertical axes.

3. In an industrial truck, the combination of a truck chassis, a rockable axle, means pivotally connecting the axle to the chassis whereby the axle may rock upon a longitudinally extending axis relative to the truck frame, a torsion means disposed to react between the pivot means and the truck chassis, a dirigible spindle member mounted adjacent each end of the axle within hollow bearing housings formed on the axle, a pair of wheels connected to each spindle member with the axes of the spindle member disposed centrally of said pairs of wheels and steering mechanism connecting the spindle members, whereby said pairs of wheels may be steered in unison about said vertical axes.

4. In an industrial truck, the combination of a truck chassis, an axle member rockably connected thereto, fork-shaped spindle members mounted adjacent the ends of the axle to be turnable about vertical axis, a pair of wheels connected to the spindle members to be independently revoluble, about non-rotating wheel spindles carried by the spindle members, a steering rod connected to one of the spindle members, steering mechanism connected to one of the fork portions of a spindle member, and a tie rod connecting the fork portions of the spindle members whereby said pairs of wheels may be turned in unison about the said vertical axis, said wheel spindles carrying bearing members adjacent the outer ends thereof and a pair of opposed inner bearing members of greater diameter than the outer bearing members and serving to support said wheels.

5. In an industrial truck, a dirigible wheel mounting steerable about a vertical axis, the lower end thereof being forked, an odd number of independently rotatable wheels supported by the forked end of said member with one of the wheels in the plane of said vertical axis, a spindle member carried by the forked end of the dirigible spindle member and two of said wheels being equi-distantly disposed on each side of the vertical axis of said dirigible spindle member.

6. In an industrial truck, a fork-shaped dirigible wheel mounting steerable about a vertical axis, three independently rotatable wheels supported by the forked end of said member, two of said wheels being equi-distantly disposed on each side of the vertical axis of said spindle member, a spindle member non-rotatably supported by said forked end and supporting bearings on the last-named spindle member for rotatably supporting said wheels.

7. In an industrial truck, the combination of a chassis, an axle, means pivotally connecting the axle to the chassis, whereby relative rocking movement may take place between the chassis and axle, said means comprising depending chassis members extending downwardly along the forward and rearward sides of the axle at the center thereof, a pin member extending through said depending members and through the axle, and means for preventing relative turning movement between the pin and axle, resilient means interposed between the pin member and said depending parts of the chassis, and means on the pin member for compressing the resilient means, whereby when the axle rocks relative to the chassis, said resilient means is subjected to torsional stresses.

8. In an industrial truck, the combination of a chassis, an axle, means pivotally connecting the axle to the chassis, said means comprising depending chassis parts extending downwardly along the forward and rearward sides of the axle, a pin member extending through said depending parts and through the axle, and means for preventing relative turning movement between the pin and axle, resilient sleeves interposed between the pin member and said depending parts of the chassis, and means associated with the pin member for compressing the sleeve members, whereby when the axle rocks said sleeve members are subjected to torsional stresses.

9. In an industrial truck, the combination of a chassis, an axle, means pivotally connecting the axle to the chassis including a torsion means interposed between the axle and chassis for maintaining the axle normally level relative to the chassis, said axle having bearing housings formed adjacent its ends, spindle members vertically supported in said housing portions of the axle, said spindle members having downwardly extending fork formations, wheel spindles non-rotatably carried by the fork formations, a pair of wheels mounted upon each wheel spindle, with each wheel of each pair of wheels equi-distantly spaced from the axis of the vertical spindle, and means for turning said vertical spindles in unison to thereby steer the wheels, said steering means being operative during relative rocking movements between said axle and chassis.

10. In an industrial truck, the combination of a chassis, an axle, means pivotally connecting the center of the axle to the chassis, said axle having bearing housings formed at its ends, spindle members vertically supported in said housing portions of the axle and completely enclosed thereby, said spindle members having downwardly extending fork formations, wheel spindles non-rotatably carried by the fork formations, sets of bearing members carried by the wheel spindles, a pair of wheels mounted upon the bearings on each wheel spindle, the wheels being equi-distantly spaced from the axes of the vertical spindles, means for turning said vertical spindles in unison and steering means connected to the forked portion of one of the vertical spindles at a point beyond one end of the axle and arranged to be operative during relative rocking movement between said axle and chassis.

11. In an industrial truck, a dirigible wheel mounting steerable about a vertical axis, an odd number of independently rotatable wheels supported by said member, two of said wheels being equi-distantly disposed on each side of the vertical axis of said spindle members and one of the wheels being disposed within a plane extending through said vertical axis and a steering mechanism for turning the spindle member about said vertical axis.

12. In an industrial truck, the combination with a truck chassis of a trailer axle pivotally connected to the chassis to tilt about a longitudinally extending axis which is fixed relative to the truck chassis, said axle comprising a unitary structure having spindle housing formations at each end thereof with an integral beam formation directly connecting the sides of the housing portions and the lower part of the beam extending substantially horizontally inwardly from the lower parts of the housing portions, spindle members vertically journaled in the housing portions of the axle, the spindle members having lower fork formations extending laterally beneath the lower horizontal portions of the axle and the fork portions of the spindles having steering arms connected thereto, a tie rod adjustably connected to said arms, a rocker pin supported by the chassis and serving to support the axle and extending through the axle structure below the tie rod and a pair of wheels carried by each fork formation of the spindle members, each wheel being mounted to rotate independently of the other wheels.

13. In an industrial truck, the combination with a truck chassis of a trailer axle pivotally connected to the chassis to tilt about a longitudinally extending axis which is fixed relative to the truck chassis, said axle comprising a unitary structure having spindle housing formations at each end thereof with an integral beam formation directly connecting the sides of the housing portions, spindle members vertically journaled in the housing portions of the axle, the spindle members having lower fork formations having provision for rigid connections for steering arms, steering arms connected thereto to extend outwardly at an angle relative to a plane passing vertically and longitudinally through the spindle centers, an adjustable tie rod connected to said arms, a rocker pin supported by the chassis and fixed to the axle structure below the tie rod and a pair of wheels carried by each fork formation of the spindle members, each wheel being mounted to rotate independently of the other wheels.

CLYDE E. COCHRAN.